UNITED STATES PATENT OFFICE.

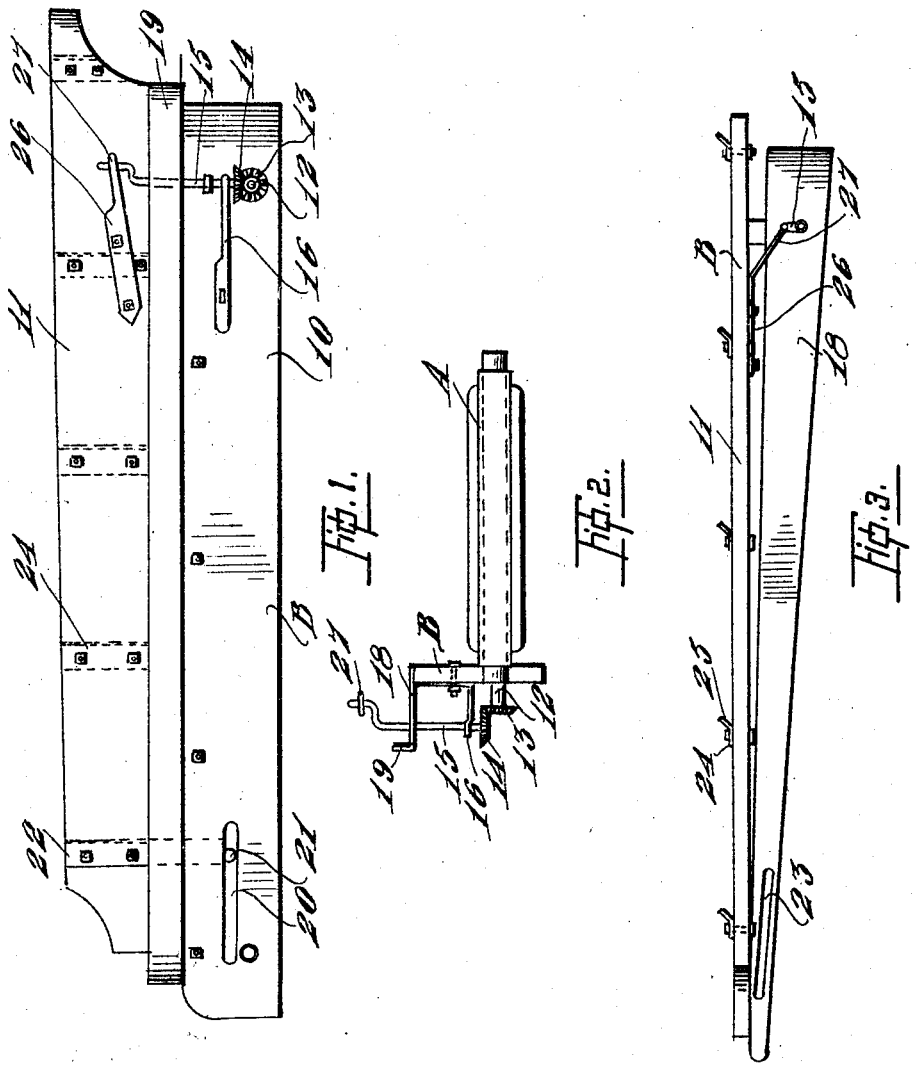

HENRY JACOB FREDRICK LUCHSINGER, OF WEYBURN, SASKATCHEWAN, CANADA.

GRAIN FEEDER FOR THRASHERS.

1,410,334. Specification of Letters Patent. Patented Mar. 21, 1922.

Application filed March 6, 1920. Serial No. 363,914.

*To all whom it may concern:*

Be it known that I, HENRY JACOB FREDRICK LUCHSINGER, a subject of the King of Great Britain, a resident of the town of Weyburn, Province of Saskatchewan, Dominion of Canada, have invented certain new and useful Improvements in Grain Feeders for Thrashers, of which the following is a specification.

This invention relates to improvements in carrier feeders for grain thrashers.

In carrier feeders at present manufactured for standard types of grain thrashers it is found, that as the bundles of grain are delivered to the carriers, some of the bundles fall sidewise instead of lengthwise and thus become lodged between the side walls of the carrier.

Under such circumstances a blockage takes place resulting in the machinery speeding up to too high a speed, so that consequently grain is thrown over into the stack.

When this blockage or jam is loosened by a fork too much unthrashed grain passes into the thrasher at one time, and the result again is that grain is thrown over into the stack.

The objects of the present invention are to eliminate these objections and to provide means for automatically righting the position of the bundles of grain on the carrier, and if the bundles are thrown crosswise of the carrier they will be mechanically and automatically brought into the proper alignment and fed to the thrasher, thus eliminating all possibilities of blocking or jamming.

Further objects are to prevent any loss of grain from the carrier during the feeding of the bundles to the thrasher, to simplify the several parts, and generally to adapt the carrier to better perform the functions required of it.

With the above and other objects in view, the invention consists essentially of the improved construction particularly described and set forth in the following specification and accompanying drawings forming part of the same.

In the drawings:

Figure 1 is a side elevation of the walls of a carrier embodying my invention.

Figure 2 is an end view in part only of a carrier showing a lower fixed side wall and means for actuating an upper movable portion of the side walls.

Figure 3 is a plan view of the movable portion of the side wall, and showing the plate for preventing loss of grain during the lateral movement of the side wall.

Like characters of reference refer to like parts in the several figures.

Referring to the drawings; A represents a feeder provided with side walls B each formed of a lower fixed portion 10 and an upper movable portion 11.

In the lower fixed portion 10 of the side wall of the feeder the main driving shaft 12 is journalled, and the ends of the shaft overhang the said fixed portion and are provided with bevelled gears 13.

Only one completed side wall B is illustrated but it will be understood that there are two walls, one on each side of the carrier.

Each bevelled gear 13 meshes with a gear 14 carried by a vertically disposed crank shaft 15 which is journalled in a suitable bearing 16. The laterally extending covering plate 18 also forms a bearing and terminates at the outer edge in a vertically disposed flange 19.

Each lower portion 10 of the side wall is provided adjacent to the front end with an elongated orifice 20 with which the pin 21 carried by the vertically disposed bar 22 engages, the said bar 22 being connected to the portion 11.

The vertically disposed bar 22 passes through an elongated orifice 23 in the plate 18.

On the inner wall of each of the movable upper portions 11 of the side walls B a plurality of vertically disposed bars 24 are provided having their rear vertical edges flanged at 25, and the rear end of the upper portion 11 has a bracket 26 secured thereto, and formed with an offset arm 27 which engages with the crank shaft 15.

When a thrasher equipped with this form of feeder is in use and bundles of grain are thrown sidewise onto the carrier A, and during the operation of the carrier the upper portions 11 of the side walls B are reciprocated longitudinally and have a simultaneously lateral movement due to the rotation of the crank shaft 15.

It will be evident that the flanged vertical edges 25 of the bars 24 will engage with the bundles lying transversely of the carrier A, and the inward and longitudinal movement of the side members 11 will cause the flanges 25 to turn the bundles of grain longitudinally on the carrier A, and thus permit of their being fed to the thrasher.

It will be evident that when the upper portions 11 of the side walls B are moved laterally inwardly of the carrier that a space will be left between the upper and lower portions 11 and 10 of the said side walls, but this space is bridged by the tapered plates 18 which thus prevent any loss of grain from the carrier.

This form of carrier may be advantageously utilized on any standard type of thrasher at present in use, and the movement of the upper portions of the side walls is so controlled that it is simultaneous with the operation of the carrier. There are no working parts concealed or likely to get out of repair, and the device is of an extremely simple nature capable of being readily inspected at all times.

As many changes could be made in the above construction and many widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. In a carrier feeder, side walls each formed in two portions, one portion being fixed, and the other portion adapted to be moved longitudinally and laterally, a covering plate between the two portions of each wall and sheaf engaging means carried by the movable portion.

2. In a carrier feeder, side walls each formed in two portions, one portion being fixed, and the other portion adapted to be moved longitudinally and laterally, a plate between the upper and lower portions of each wall, bars on the upper wall having angularly disposed flanges and sheaf engaging means carried by the movable portion.

3. In a carrier feeder and in combination, a fixed wall, a movable wall mounted above the same, the fixed wall having a longitudinal slot therein, a bar carried by the movable wall having a pin extending in the longitudinal slot, sheaf engaging means on the movable wall, a crank member suitably journalled on the fixed wall, a bracket on the movable wall engaging the crank member and means for driving the crank member.

4. In a carrier feeder and in combination, a fixed wall, a movable wall mounted above the same, the fixed wall having a longitudinal slot therein, sheaf engaging means on the movable wall, a bar carried by the movable wall having a pin extending in the longitudinal slot, a crank member suitably journalled on the fixed wall, a bracket on the movable wall engaging the crank, means for driving the crank, and a plate on the movable wall adapted to extend over and cover the space between the movable and fixed walls when the movable wall is moved inwardly.

In witness whereof I have hereunto set my hand in the presence of two witnesses.

HENRY JACOB FREDRICK LUCHSINGER.

Witnesses:
M. A. MILLER,
H. U. MURPHY.